Feb. 18, 1941.　　　T. E. CHERRY　　　2,232,367
SCRAPING DEVICE
Filed Nov. 16, 1938　　　2 Sheets-Sheet 1
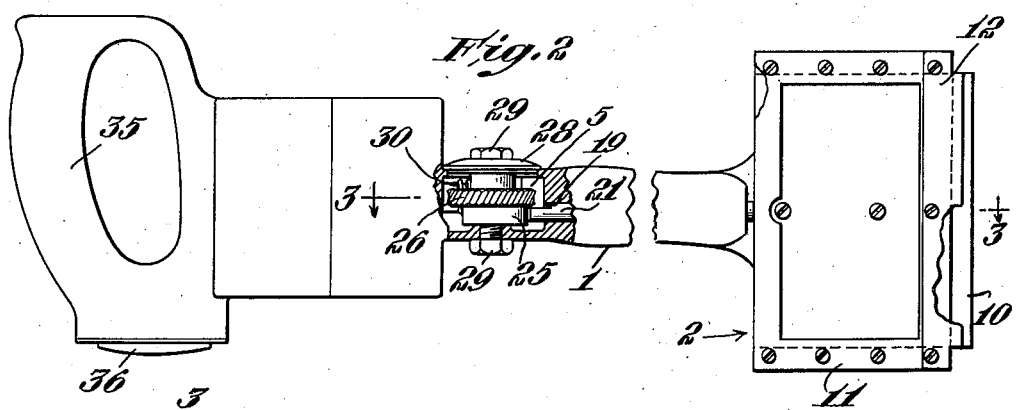
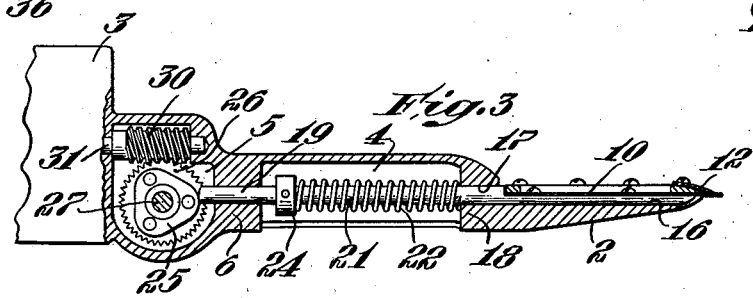
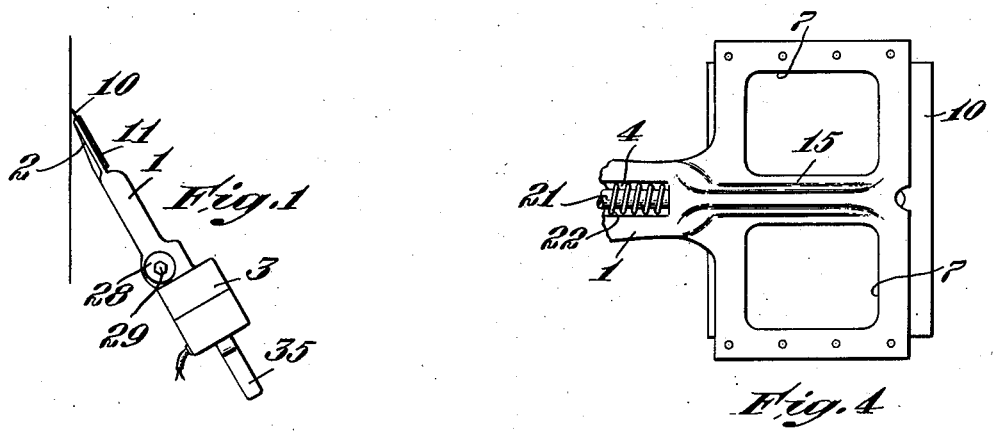
Inventor
Thomas E. Cherry
by Roberts, Cushman & Woodbury
Attys.

Feb. 18, 1941. T. E. CHERRY 2,232,367
SCRAPING DEVICE
Filed Nov. 16, 1938 2 Sheets-Sheet 2
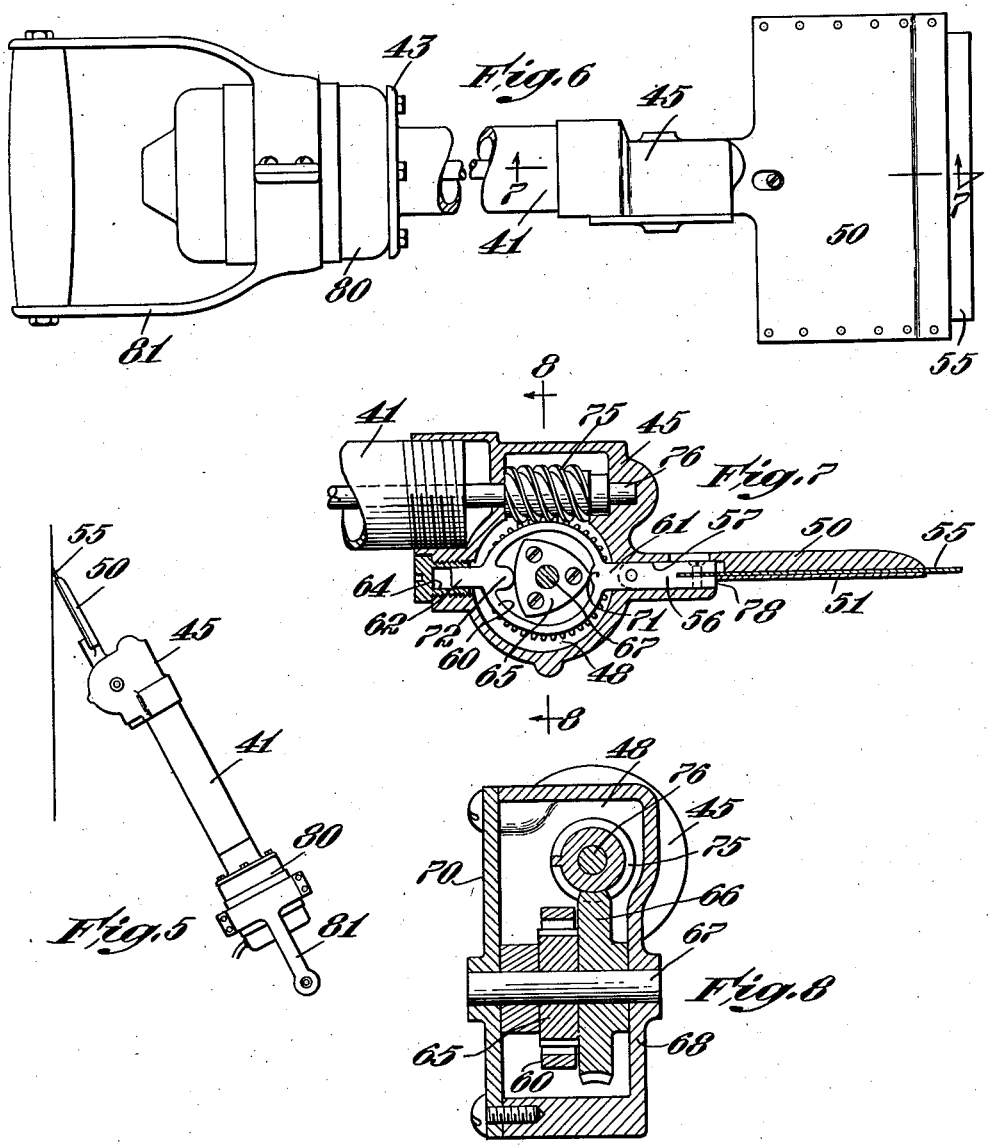
Inventor
Thomas E. Cherry
By Roberts, Cushman & Woodbury
att'ys.

Patented Feb. 18, 1941

2,232,367

UNITED STATES PATENT OFFICE 2,232,367

SCRAPING DEVICE

Thomas E. Cherry, Cambridge, Mass.

Application November 16, 1938, Serial No. 240,625

6 Claims. (Cl. 30—272)

This invention relates to power-actuated scraping or cutting devices suitable for removing paper, paint and other coating materials from a wall, ceiling or like surface.

The principal objects of the invention are to provide a scraper or cutting device which is of strong and durable construction and reliable and efficient in operation, to provide a scraper which is so constructed and designed that particles removed from a wall or other surface cannot penetrate into the vicinity of the actuating mechanism, and to provide a scraper in which friction with consequent deterioration of parts and overheating is reduced to a minimum.

Further objects will be apparent from a consideration of the following description and the accompanying drawings, wherein:

Fig. 1 is a side elevation, on a reduced scale, of a scraper constructed in accordance with the present invention and illustrating a manner of using the same;

Fig. 2 is a top plan view, with parts broken away and shown in section, of the device shown in Fig. 1;

Fig. 3 is a section on the line 3—3 of Fig. 2;

Fig. 4 is a bottom plan view of the front end of the device;

Fig. 5 is a view, similar to Fig. 1, but illustrating a modified embodiment of the invention;

Fig. 6 is a top plan view, with parts broken away and shown in section, of the embodiment shown in Fig. 5;

Fig. 7 is an enlarged section on the line 7—7 of Fig. 6; and

Fig. 8 is an enlarged section on the line 8—8 of Fig. 7.

The embodiment shown in Figs. 1 to 4 comprises an elongate casting 1 having at its outer end a flattened and widened nosepiece, designated by the numeral 2, the inner end of the casting being enlarged to provide a section of a generally cylindrical housing 3 for an electric motor (not shown). The intermediate portion of the casting 1 is formed with an open pocket or recess 4 and a chamber 5 separated from the pocket 4 by an intervening wall portion 6, as shown in Fig. 3.

The nosepiece 2 is formed with a pair of spaced rectangular openings 7 (Fig. 4) and the marginal portions surrounding these openings provide a supporting frame for a reciprocating scraper blade 10. The upper face of the nosepiece is provided with a rectangular frame or retainer member 11 (Figs. 2 and 3) formed along its side edges with spacers effective to hold its front and rear parts in spaced relation to those of the nosepiece, thereby providing lateral guides for the scraper blade 10. The front of the frame member 11 is provided with a curved guard piece 12 which extends outwardly with its end terminating closely adjacent to the outer edge of the scraper blade 10, the purpose being to provide a shield effective to deflect scrapings falling upon the nosepiece 2 when the machine is operated.

The central part 15 (Fig. 4) of the nosepiece is formed with a longitudinally extending groove 16 (Fig. 3) in alignment with an opening 17 formed in the wall 18 of a pocket 4 and an opening 19 formed in the wall 6. The scraper blade 10 has a snug sliding fit between the upper face of the nosepiece and the retaining member 11 and is riveted or otherwise rigidly secured to the flattened outer end of an actuating arm 21. The outer end of the arm 21 fits within the groove 16 and its inner portion extends rearwardly through the opening 17, the recess 4 and the opening 19, its inner end terminating within the chamber 5, as shown in Fig. 3.

A coil compression spring 22 is circumposed about that portion of the arm 21 within the pocket 4 and one end of this spring acts against the wall 18 and its opposite end engages a collar 24 pinned or otherwise secured to the arm 21. The spring 22 is at all times under sufficient compression to urge the arm 21 inwardly in operative relation to the actuating mechanism presently to be described.

The actuating mechanism comprises a generally triangular-shaped cam 25 secured to one face of a worm gear 26 which is rotatably mounted on a shaft 27 having threaded ends, one of which extends through an opening in the side wall of the chamber 5 and its other end extending through an opening in a disk-like closure 28 (Fig. 2) which tightly fits about the opening to the chamber 5, the shaft 27 and closure 28 being held in position by the nuts 29, as shown in Fig. 2. The gear 26 is driven by a worm 30 fixed to a drive shaft 31 which is suitably journaled in openings formed in the opposite walls of the chamber 5, the inner end of the drive shaft extending into the interior of the housing 3 and being connected to the electric motor therein. The parts are preferably so constructed and arranged that the inner end of the arm 21 is at all times held in operative engagement with the cam 25 so that rotation of the gear and cam effects reciprocation of the arm and scraper. The chamber 5 and its closure 28 are designed to hold a suitable lubricant, such as grease or heavy oil, which not only ensures adequate lubrication of the parts, but also serves to effect an efficient dissipation of heat generated during the operation of the device. If desired, the stroke or magnitude of the reciprocating movement of the arm and scraper blade may be varied by adjusting the position of the collar 24 relative to the wall 6 so that the collar serves as a stop to limit the inward movement of the arm.

The housing 3 for the electric motor comprises a pair of generally cylindrical sections, one of which, as above pointed out, is integral with the casting 1, and the other section carries a handle member 35 by means of which the device may be manipulated. The handle 35 is also provided with an electric switch 36 (Fig. 2) conveniently located for ready operation.

It will be noted that the construction of the device above described is such that scrapings, particularly small particles, cannot possibly work their way from the nosepiece into the interior of the chamber 5 which houses the actuating mechanism, since the only possible access to this chamber is through the opening 19, but in view of the fact that particles necessarily would have to pass through the open pocket 4 to reach this point, it will be seen that the movement of the arm 21 is effective to prevent accumulation of particles within the pocket 4, as well as working their way along the inner end of the arm 21.

The embodiment shown in Figs. 5 to 8 is similar in principle to that previously described and comprises an elongate tubular body member 41 formed at one end with a flange 43, its opposite end having a threaded engagement with a casting 45. The casting 45 is formed with a chamber 48 at one end and its opposite end terminates in a flattened and widened nosepiece 50 provided with a retainer member 51 (Fig. 7) which may be of a construction similar to that of the previously described embodiment. The nosepiece 50 and retainer 51 support a scraper blade 55 for reciprocating movement, and the inner end of the scaper blade is rigidly secured to an actuating arm 56 slidably mounted in an opening 57 which communicates with the chamber 48.

The inner end of the arm 56 is associated with an actuating mechanism comprising a yoke member 60 having at diametrically opposite points outwardly projecting arms 61 and 62. The arm 61 is slidably supported in the opening 57 and is connected with the inner end of the arm 56, and the arm 62 is slidably supported in a bushing 64 mounted in an opening in the rear wall of the chamber 48. The body of the yoke 60 extends about a generally triangular cam 65 which is secured to one face of a worm gear 66 rotatably mounted on a shaft 67 whose opposite ends are anchored in openings formed in the side wall 68 and a closure 70 for the chamber 48. The yoke 60 is formed with inwardly projecting bosses 71 and 72 engageable with the periphery of the cam 65 so that rotation of the latter effects reciprocation of the yoke and associated parts. The gear 66 is driven by a worm 75 fixed to a drive shaft 76 which is journaled in openings in opposite walls of the chamber 48, as shown in Fig. 7. The chamber 48 is designed to hold a suitable lubricant and to this end the arm 56 accurately fits the opening 57 so as to prevent leakage. In order to provide for the discharge of scrapings tending to work their way toward the actuating mechanism, the outer end of the opening 57 extends to the rear edge of the retainer member 51, thus providing a discharge port 78, as shown in Fig. 7.

The drive shaft 76 extends through the body 41 and is connected in any suitable manner with an electric motor 80 which is rigidly secured to the flange 43. A handle 81 is attached to the casing of the motor 80 and a control switch (not shown) may be provided for convenient operation.

While I have shown and described different desirable embodiments of the invention, it is to be understood that the disclosure is for the purpose of illustration and that various changes in shape, proportion, and arrangement of parts, as well as the substitution of equivalent elements for those herein shown and described, may be made without departing from the spirit and scope of the invention as set forth in the appended claims.

I claim:

1. A scraping device of the class described, comprising a member formed at one end with a substantially enclosed chamber for holding a lubricant and at its opposite end with a substantially flat nosepiece and a discharge port between the chamber and nosepiece, a scraper blade mounted on said nosepiece for reciprocating movement, said scraper blade having an actuating member extending by said discharge port and into the interior of said chamber, actuating mechanism within said chamber operatively associated with said actuating member so as to effect a reciprocation of said scraper blade.

2. A scraper device of the class described, comprising an elongate member having adjacent to one end a substantially leakproof chamber for holding a lubricant and at its intermediate portion a pocket separated from said chamber by a wall having a discharge opening therein, the other end of said member terminating in a substantially flat nosepiece, a scraper blade mounted on said nosepiece for reciprocating movement, said scraper blade having an actuating member extending through said pocket and into the interior of said chamber, actuating mechanism within said chamber operatively associated with said actuating member so as to effect reciprocation of said scraper blade.

3. A scraper device of the class described, comprising an elongate member having adjacent to one end a substantially leakproof chamber for holding a lubricant and at its intermediate portion a pocket separated from said chamber by a wall having a discharge opening therein, the other end of said member terminating in a substantially flat nosepiece, a scraper blade mounted on said nosepiece for reciprocating movement, said scraper blade having an actuating member extending through said pocket and into the interior of said chamber, actuating mechanism within said chamber and pocket, said mechanism comprising a worm and gear, a cam secured to one face of the gear, and spring means associated with that portion of the actuating member passing through said pocket and operative to urge said actuating member inwardly into operative engagement with said cam.

4. A scraper device comprising an elongated casting formed at one end with a flattened nosepiece having discharge openings in combination with an upper plate having like discharge openings and defining with said nosepiece guiding means extending inwardly from its outer edge, said casting having at its intermediate portion a recess and at its opposite end an enclosed substantially leakproof chamber for holding a lubricant, a scraper blade mounted in said guiding means for reciprocating movement, reciprocating mechanism within the chamber, and means connecting said mechanism and scraper blade so as to effect the reciprocation of the latter.

5. A scraper device comprising an elongate casting formed at one end with a flattened nosepiece having discharge openings in combination with an upper plate having like discharge openings and defining with said nosepiece guiding means extending inwardly from its outer edge, said casting having at its intermediate portion a recess providing a further means of discharging waste material and at its opposite end a substantially leakproof chamber for holding a lubricant, a reciprocating mechanism within the chamber, a scraper blade mounted in said guiding means for reciprocating movement, and connection between said mechanism and scraper blade operative to effect the reciprocation of the latter.

6. A scraper device of the class described, comprising an elongate casting formed at one end with a flattened nosepiece having discharge openings in combination with an upper plate having similarly formed discharge openings, said nosepiece and plate defining lateral guides extending inwardly toward the casting body, said casting body having an intermediate recess and a substantially enclosed chamber at the end remote from said nosepiece, a scraper blade mounted in said guides for reciprocating movement, and actuating mechanism disposed within said chamber comprising a worm and gear, a triangular cam secured to one face of the gear, and an actuating arm extending from said chamber through said recess, the outer end of said arm being connected with said scraper blade and its inner end being operatively associated with said cam, and spring means disposed within said recess and acting on said arm to urge it inwardly.

THOMAS E. CHERRY.